(12) United States Patent
Wilson

(10) Patent No.: US 9,605,419 B2
(45) Date of Patent: Mar. 28, 2017

(54) PISTON-TYPE FLUSHOMETER VALVE

(71) Applicant: Sloan Valve Company, Franklin Park, IL (US)

(72) Inventor: John R. Wilson, Naperville, IL (US)

(73) Assignee: SLOAN VALVE COMPANY, Franklin Park, IL (US)

( * ) Notice: Subject to any disclaimer, the term of this patent is extended or adjusted under 35 U.S.C. 154(b) by 55 days.

(21) Appl. No.: 13/970,116

(22) Filed: Aug. 19, 2013

(65) Prior Publication Data

US 2014/0053922 A1    Feb. 27, 2014

Related U.S. Application Data

(60) Provisional application No. 61/692,484, filed on Aug. 23, 2012.

(51) Int. Cl.
*F16K 21/12*  (2006.01)
*E03D 3/04*   (2006.01)

(52) U.S. Cl.
CPC ............. *E03D 3/04* (2013.01); *F16K 21/12* (2013.01); *Y10T 137/7768* (2015.04)

(58) Field of Classification Search
CPC .................................. F16K 21/12; E03D 3/04
USPC ............ 251/28, 29, 30.01–30.05, 40, 62–63, 251/123–124
See application file for complete search history.

(56) References Cited

U.S. PATENT DOCUMENTS

| 438,572   | A |   * | 10/1890 | Coffield   | F16K 1/42    |
|-----------|---|-----|---------|------------|--------------|
|           |   |     |         |            | 251/365      |
| 1,816,205 | A |   * | 7/1931  | Biedermann | F16K 15/06   |
|           |   |     |         |            | 137/533.29   |
| 1,912,937 | A |   * | 6/1933  | George     | 251/21       |
| 2,082,226 | A |   * | 6/1937  | Stafford   | E03C 1/108   |
|           |   |     |         |            | 137/216      |
| 2,148,383 | A |   * | 2/1939  | Tyden      | A62C 35/645  |
|           |   |     |         |            | 137/79       |
| 2,219,324 | A |   * | 10/1940 | Lee        | F16K 25/04   |
|           |   |     |         |            | 251/123      |
| RE23,985  | E |   * | 4/1955  | MacGregor  | F16K 1/06    |
|           |   |     |         |            | 251/50       |
| 2,877,978 | A |   * | 3/1959  | Rider      | F16K 31/385  |
|           |   |     |         |            | 137/489      |
| 2,891,570 | A |   * | 6/1959  | Krupp      | 137/509      |
| 3,703,273 | A |   * | 11/1972 | Illing     | F16K 47/04   |
|           |   |     |         |            | 138/46       |

(Continued)

FOREIGN PATENT DOCUMENTS

CA    2484022       4/2005
CN    1763321 A     4/2006
(Continued)

OTHER PUBLICATIONS

Office Action for Canada App. No. 2,824,478, dated Nov. 27, 2014, 2 pages.
(Continued)

*Primary Examiner* — Marina Tietjen
(74) *Attorney, Agent, or Firm* — Foley & Lardner LLP

(57) ABSTRACT

A main valve seat surface for engaging the piston, an outer sidewall, and an inner sidewall defining a flow passage with a first opening and an second opening, the flow passage having a reduced diameter portion.

13 Claims, 5 Drawing Sheets

(56) References Cited

U.S. PATENT DOCUMENTS

| | | | |
|---|---|---|---|
| 5,277,403 A * | 1/1994 | Waggott | F16K 39/022 251/282 |
| 5,743,717 A * | 4/1998 | Schmidt | E21B 43/123 137/155 |
| 5,881,993 A | 3/1999 | Wilson et al. | |
| 6,511,041 B2 * | 1/2003 | Faustinelli | E21B 43/123 251/118 |
| 6,666,433 B1 * | 12/2003 | Pierce | F16K 25/00 251/123 |
| 6,913,239 B2 | 7/2005 | Nortier | |
| 7,192,002 B2 | 3/2007 | Nortier | |
| 2003/0089869 A1 * | 5/2003 | Hall | F16K 1/38 251/122 |
| 2008/0073609 A1 | 3/2008 | Akkermann | |
| 2008/0149868 A1 | 6/2008 | Bittner et al. | |

FOREIGN PATENT DOCUMENTS

| | | |
|---|---|---|
| CN | 201818892 | 5/2011 |
| CN | 102449364 A | 5/2012 |
| RU | 2001343 | 10/1993 |

OTHER PUBLICATIONS

First Office Action for Chinese App. No. 201310373235.0, dated Aug. 22, 2014, 21 pages.
Second Office Action for Chinese App. No. 201310373235.0 with English translations, dated Apr. 14, 2015, 24 pages.
3rd Chinese Office Action for Application No. 201310373235.0; Issued Oct. 19, 2015, 7 pages.

* cited by examiner

PISTON-TYPE FLUSHOMETER VALVE

CROSS-REFERENCE TO RELATED APPLICATIONS

This application claims priority from U.S. Provisional Patent Application 61/692,484 filed Aug. 23, 2012 the contents of which are hereby incorporated by reference in its entirety

FIELD OF THE INVENTION

The present invention relates generally to the field of flushometer valves. More specifically, the present invention relates to piston-type flushometer valves.

BACKGROUND OF THE INVENTION

This invention generally relates to a flushometer for use in a urinal, water closet, or the like. More particularly, the invention relates to an improved piston-type flushometer valve.

Various types of piston-type flushometers are known in the art, as exemplified by the flush valve shown in U.S. Pat. No. 5,881,993. Another type of piston-type flushometer is taught, for example, in U.S. Pat. No. 6,913,239, which includes a domed inner cover defining the top of a control chamber. The teachings of these patents are hereby incorporated herein by reference.

Typically flushometers include a valve (piston or diaphragm) which seals the water inlet from the outlet of the valve body. The valve is controlled, at least in part, by utilizing pressure differentials, with a control chamber located within the valve body at its upper most interior. The control chamber functions to control the reseating of the valve upon the valve seat. An auxiliary valve controllably seals the control chamber from the outlet and bypasses provide metered control flow from the inlet to the control chamber. Thus, the control chamber can be pressurized to the pressure of the inlet via communication through the bypasses. As the line pressure in the control chamber acts on a larger topside area of the piston or diaphragm than the inlet line pressure acts on smaller underside area of the piston or diaphragm, the valve remains closed under equal pressures in a steady state condition. When the auxiliary valve is opened, the control chamber becomes exposed to a lower pressure i.e., smaller force, and the contents of the control chamber are vented into the outlet reducing the downward force exerted on the piston and allowing it to raise off the main seat creating an opening so that water from the inlet may flow to the outlet. The water flows over the main piston seat. The control chamber is repressurized via the bypass(es) and the valve closes as the force in the control chamber on the piston top increases past the force pushing on the underside of the piston body.

Prior piston-type flushometers experience numerous forces that result in imprecise or inaccurate flush volumes or undesirable flush profiles. For example, an air pocket may develop in the upper pressure chamber. Further, the piston, as it is reseating on the main valve seat during a flush cycle, experiences forces from the exhausting water that resist proper seating of the piston on the valve seat.

SUMMARY OF THE INVENTION

One embodiment of the invention relates to a flush valve system comprising a hollow valve body having an inlet, an outlet, and a main valve seat there between. A piston assembly is movable within the hollow valve body and configured to seat upon the main valve seat to seal the inlet from the outlet. An upper pressure chamber is positioned above the piston assembly within the hollow valve body. The upper pressure chamber is in fluid communication with an interior of the piston assembly. A relief valve is positioned within the piston assembly. The relief valve seals the upper pressure chamber and interior of the piston assembly from the outlet. The main valve seat has a main valve seat surface for engaging the piston, an outer sidewall, and an inner sidewall defining a flow passage with a piston-side opening and an outlet-side opening, the flow passage having a reduced diameter portion.

Another embodiment of the invention relates to a valve seat for a piston-type flushometer. The valve seat includes a main valve seat surface for engaging the piston, an outer sidewall, and an inner sidewall. The inner sidewall defines a flow passage with a first opening and an second opening, the flow passage having a reduced diameter portion.

A flush valve system comprising a hollow valve body having an inlet, an outlet, and a main valve seat there between. The hollow valve body further includes a handle opening. A piston assembly is movable within the hollow valve body and configured to seat upon a main valve seat to seal the inlet from the outlet. An upper pressure chamber is positioned above the valve member within the hollow valve body. The piston assembly includes a piston having an interior piston chamber and a cap. The main valve seat has a assembly main valve seat surface for engaging the piston, an outer sidewall, and an inner sidewall defining a flow passage with a piston-side opening and an outlet-side opening, the flow passage having a reduced diameter portion.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE PREFERRED EMBODIMENTS

Figure 1A:
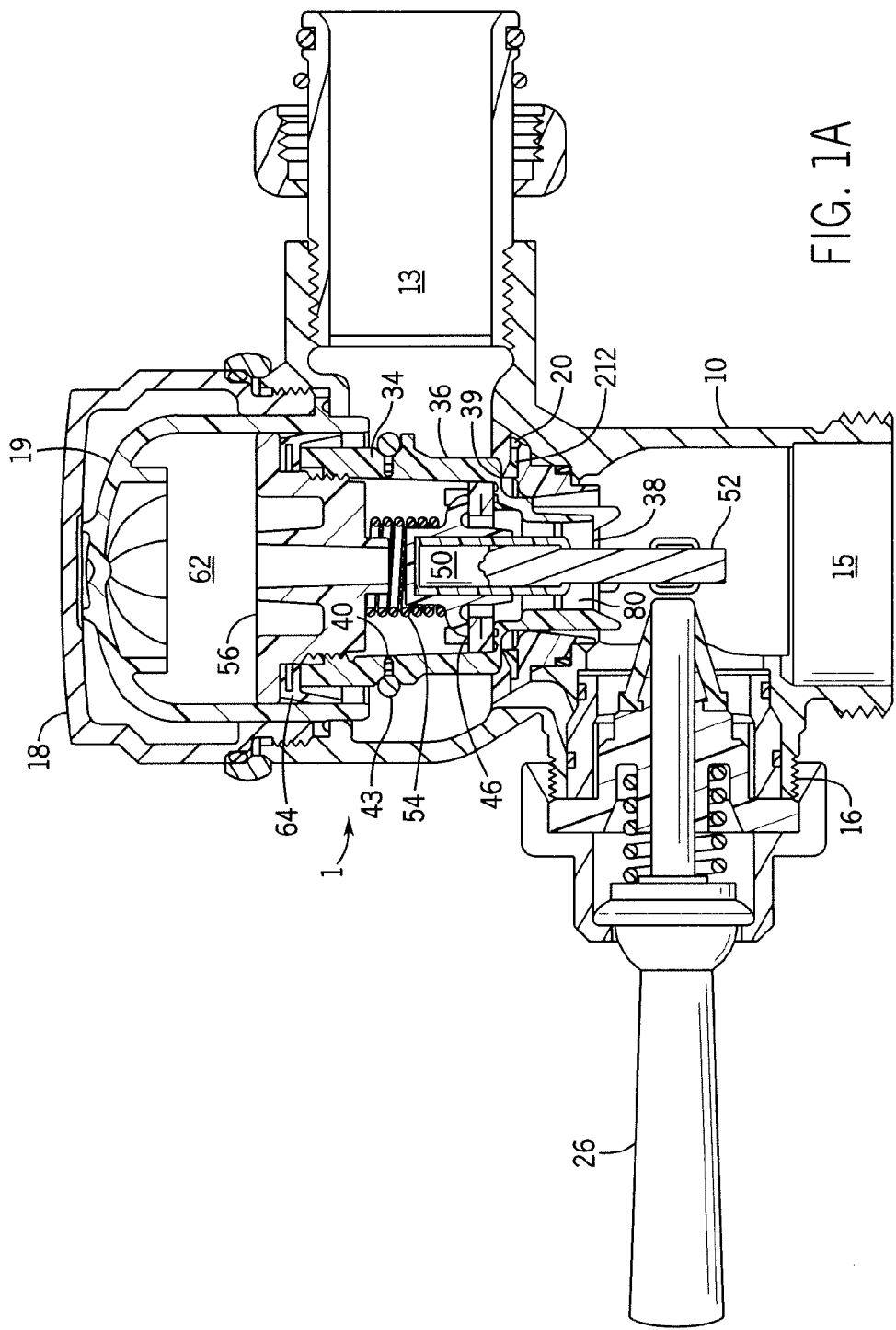
FIG. 1A is a vertical section through a piston-type flushometer in accordance with one embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

U.S. Pat. Nos. 5,881,993 and 7,192,002, incorporated herein by reference, generally show the structure of prior art piston-type flushometers. Embodiments of the present invention relate to a modified piston-type flushometer having a tapered seat assembly for reducing the impact of various forces acting on the piston during closing of the valve. FIG. 1A illustrates a flushometer valve in accordance with the present invention. The flushometer, as shown, has a generally hollow valve body 10 which includes an inlet 13, an outlet 15, and an actuator opening 16 for coupling an actuation mechanism (not shown), either manual, automatic, or a hybrid, to the valve body 10. The top of the valve body 10 is closed by a cover 18 and there may be a seal element 19 between the cover and the body, such as in the piston valve of FIG. 1A. In an alternative embodiment, the valve may be structured as described in U.S. Pat. No. 5,881,993 with a seal element provided between the cover 18 and the cap 56.

With continued reference to FIG. 1A a piston assembly 34 is adapted to reciprocate within the valve body 10 to seat and unseat from a main valve seat 21. The main valve seat 21 is formed on the interior walls of the valve body 10 or may be part of a main valve seat assembly 20 disposed in the valve body 10.

Figure 1B:
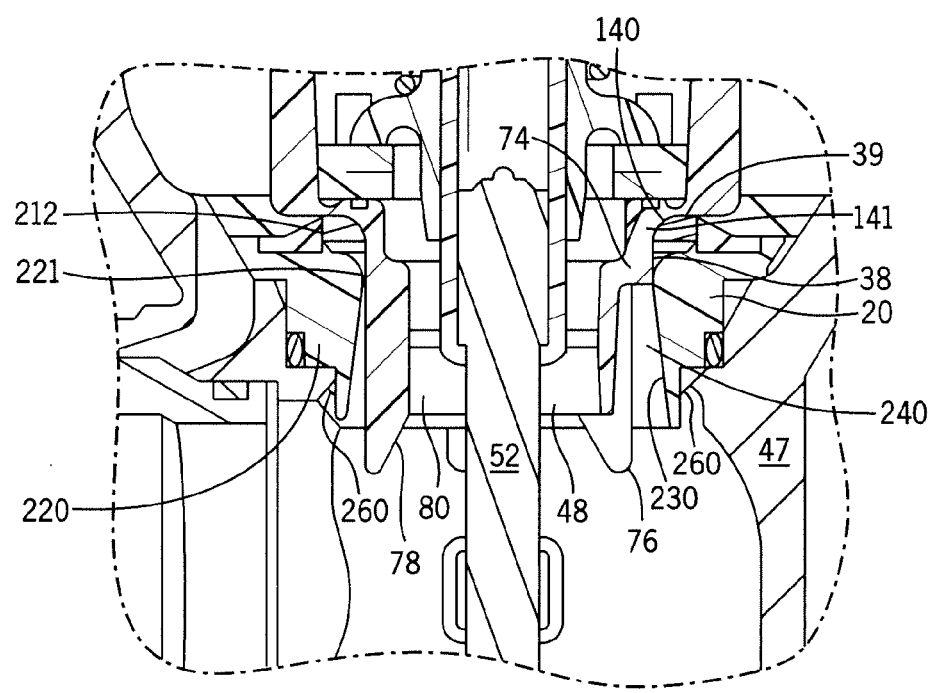
FIG. 1B is a close-up view of the main valve seat and a portion of the piston of the flushometer of FIG. 1A.

With reference to FIGS. 1A and 1B, the piston assembly 34, includes a hollow, generally cylindrical piston body 36. The piston body 36 is engageable with the main valve seat 21. In one embodiment, the piston assembly 34 further includes a cap 56 threadably engaging an upper region of the piston body and separating the piston from a pressure chamber 62 above the piston body 36. The spring 54 abuts against the cap 56 at one end and a relief valve 50 at the other. A lip seal 64 held between the cap 56 and piston body 36 provides a slidable seal separating the pressure chamber 62 from inlet water pressure. The piston assembly 34 also includes the relief valve 50 disposed within the piston body 36 and which normally closes an exhaust passage 48 of the piston body 36. The relief valve 50 engages a relief valve seat 46 formed by an annular ledge of the piston body 36. An operating stem 52 is slidable in the central hollow portion of the relief valve 50 and extends to a point adjacent plunger 26. The spring 54 assists in holding the relief valve 50 in its position to close and seal the exhaust passage 48. In one embodiment, the piston assembly 34 includes at least one piston ridge 143 (FIG. 2B) for interacting with the relief valve 50.

Figure 2A:
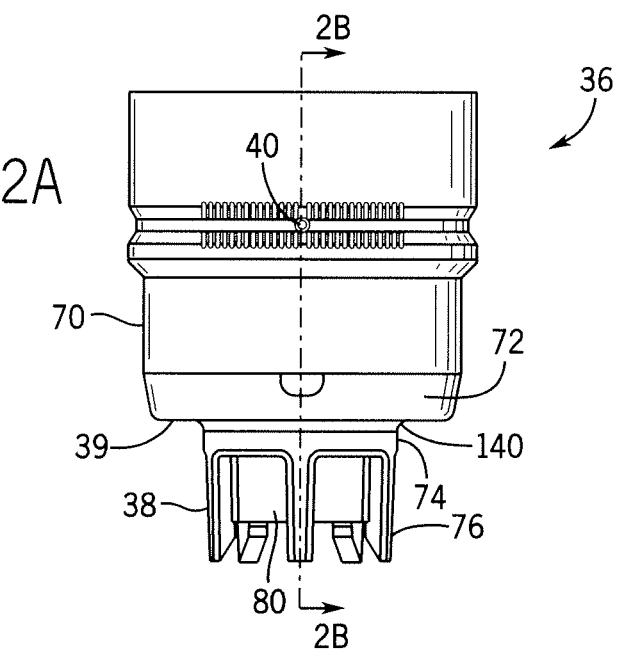
FIG. 2A is a front view of a piston.
Figure 2B:
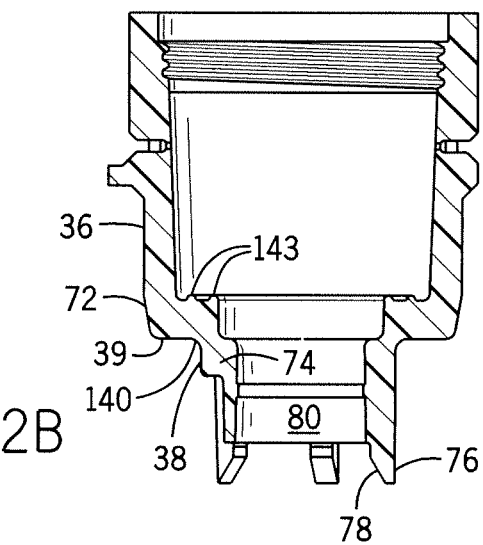
FIG. 2B illustrates a vertical section through the piston of FIG. 2A.

With reference to FIGS. 1A, 2A and 2B, the piston body 36 is shown. The piston body 36 has a wall 70 which is preferably cylindrical. The piston body 36 has a pair of bypass orifices 40 (FIG. 1A), alternatively only a single bypass or more than two bypasses may be utilized comprising a passage through the wall 70. A filter ring 43 (FIG. 1A) may be utilized in combination with the bypass orifices 40, which ring 43 functions according to known principles for providing additional anti-clogging properties (see, e.g., U.S. Pat. No. 4,261,545).

In one embodiment illustrated in FIG. 2A, within the interior and at a lower portion of the wall 70, such as an exterior perimeter adjacent the relief valve seat 46, is a tapered piston wall area 72, best shown in FIG. 2B, which may have a taper on the order of about ten degrees. The tapered piston wall area 72 is effective to provide a clear flow path about the piston when it is in the raised position away from the main valve seat 21. Directly adjacent the tapered piston wall area 72 is a piston seat area 39 of the piston body 36 which will close upon the main valve seat 21 when the valve 1 is in the closed position.

With reference to FIG. 1A, 1B, and 2A, the piston body 36 further includes a lower cylindrical extension 38 extending there from. The lower cylindrical extension 38 is configured to be disposed within the main valve seat assembly 20 when the valve is closed. is the lower cylindrical extension 38 includes a flow control ring 74, and a skirt 80 extending there from. The lower cylindrical extension 38 defines the exhaust passage 48 of the piston body 36 through which fluid exits the piston body 36.

The flow control ring 74 is, in one embodiment, positioned at a lower portion of the piston body 36 adjacent to and below the piston seat area 39. The flow control ring 74 which has an outer diameter slightly less than the diameter of a main valve seat passage 240 adjacent the piston body 36, and that of the piston body 36, so that flow control ring 74 will be inside of the main valve seat assembly 20 when the piston body 36 is closed but raised out of the main valve seat assembly 20 when the piston body 36 is raised, i.e. the valve 1 is open. The flow control ring 74 functions as a throttling means in that it substantially reduces flow through the valve just prior to complete valve closure.

In one embodiment best illustrated in FIG. 1B, the lower cylindrical extension 38 extends from the piston body 36 and includes a transition portion 140 transitioning from a piston seat area 39 to the flow control ring 74 of the lower cylindrical extension 38. In one embodiment, the piston seating area 39 is substantially horizontal and a stepped upper surface 141 of the flow control ring 74 is substantially vertical with the transition portion 140 comprising a curved shoulder transitioning there between.

The lower cylindrical extension 38 in combination with the main valve seat assembly 20 (described in detail below) provides a fluid flow path there between that results in a more gradual seating of the piston body 36. This gradual seating provides a less acute decrease in flush volume per minute as the flush cycle ends. In one embodiment, the lower cylindrical extension 38 extends below a reduced diameter portion 221 of the main valve seat flow passage 240 (described further below).

Extending from the flow control ring 74 is the skirt 80 of the piston body 36. The function of the skirt 80 is to close the area between ribs 76 to provide control of water flow past the piston, which in turn will provide a more consistent operation of the flushometer 1. The skirt 80 improves the flow path by maintaining it in an axial direction generally circumferentially about the lower cylindrical extension 38.

In one embodiment, the skirt 80 has plurality of radially and axially extending ribs 76, in one embodiment generally circumferentially uniformly spaced ribs 76. The outer diameter about the ribs 76 is less than the outer diameter of the piston body 36 and just slightly less than the main valve seat flow passage 240 through the main valve seat assembly 20. The ribs 76 are thus inside of the major portion of the piston body 36 so as not to restrict flow. In a one embodiment five ribs 76 are provided for maximizing stability and guidance for the piston body 36, without detrimentally obstructing water flow past the piston body 36 when the piston body 36 is in the valve open position. The area between each of the ribs 76 is closed by the skirt 80. The skirt 80 has a radius slightly less than the exterior surface of the ribs 76. In one embodiment, the skirt 80 terminates short of the downstream end of each of the ribs 76. In one embodiment, the ribs 76 and skirt 80 define a fixed flow area as they enter into the main valve seat flow passage 240 transitioning the water flow from main flow to low flow just before shut off. At a lower end of each of the axially extending ribs a chamfered area 78 may be provided to provide clearance to the relief valve 50 when the relief valve 50 is open.

In one embodiment of the present invention, the piston assembly 34 is provided as shown in FIG. 1B and includes a main valve seat assembly 20 having a tapered main valve seat flow passage 240. FIGS. 1A, 1B, 3A, 3B, and 3C illustrate embodiments of the main valve seat assembly 20. The main valve seat assembly 20 includes a seat surface 210 for engaging the piston seating area 39. The main valve seat assembly 20 has a generally ring shape having a main valve seat flow passage 240 there through allowing communication between the inlet 13 and outlet 15 when the piston assembly 34 is unseated. The main valve seat assembly 20 includes an outer annular sidewall 220 and an inner annular sidewall 230 circumscribing and defining the main valve seat flow passage 240.

Figure 3A:
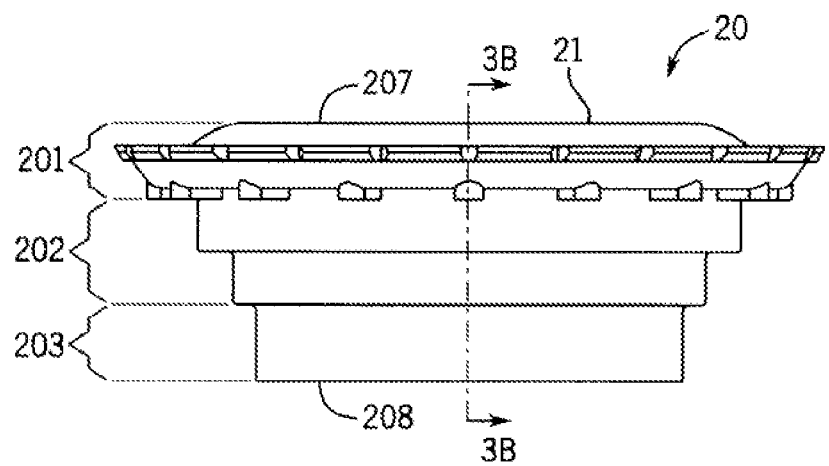
FIG. 3A is a front view of a main valve seat in accordance with one embodiment of the invention.
Figure 3B:
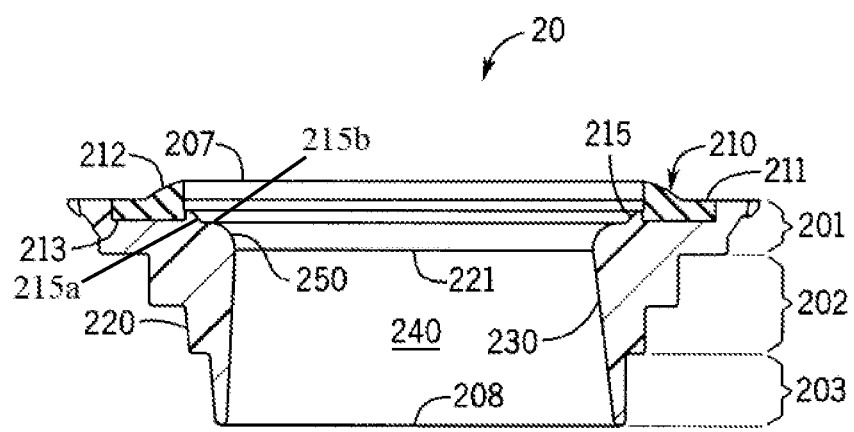
FIG. 3B is a vertical section though the main valve seat of FIG. 3A.
Figure 3C:
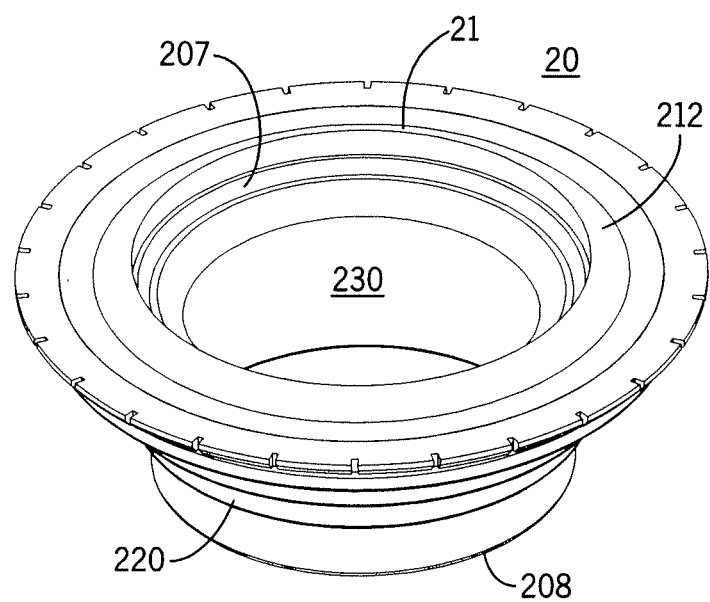
FIG. 3C is a perspective view of the main valve seat of FIG. 3A.

In one embodiment as shown in FIGS. 3A and 3B, the main valve seat assembly 20 may comprise an upper ring 201, a middle portion 202, and a lower skirt 203. In one embodiment, the main valve seat assembly 20 includes a reduced diameter portion 221 corresponding to the smallest inner diameter of the main valve seat assembly, and thus of the main valve seat flow passage 240. The main valve seat flow passage 240 includes a piston-side opening 207 in the upper ring 201 and an outlet-side opening 208 in the lower skirt 203, wherein the water flows into the main valve seat flow passage 240 at the piston-side opening 207 and exists the main valve seat flow passage 240 at the outlet-side opening 208.

The outer annular sidewall 220 may be of a substantially consistent diameter in each of these portions 201, 202, 203. Alternatively, the diameter of the outer sidewall may decrease in a stepwise fashion from the upper ring 201 to the middle portion 202 to the lower skirt 203, including stepwise decreases within each of the upper ring 201, middle portion 202 and lower skirt 203. In contrast, the inner sidewall 230 of an embodiment of the present invention may vary even within the individual upper ring 201, middle portion 202 and lower skirt 203 as best shown in FIG. 3B. In one embodiment, the diameter of the main valve seat flow passage 240 defined by the inner sidewall 230 increases from the upper ring 201 to the lower skirt 203. In one aspect, while the inner diameter of the main valve seat assembly 20 increases from the upper ring 201 to the middle portion 202 to the lower skirt 203, the outer diameter decreases such that the thickness between the inner sidewall 230 and outer sidewall 220 decreases.

The main valve seat flow passage 240 is defined by a surface of the main valve seat assembly 20 extending from the piston-side opening to the outlet-side opening 208. In one embodiment, the diameter of the main valve seat flow passage 240 transitions linearly from the diameter of the piston-side opening 207 to the diameter of the outlet-side opening 208, where the piston side opening 207 defines the reduced diameter portion 221. In one embodiment, the diameter of the outlet-side opening 208 is ~0.935 inches and the piston-side opening 207 is about 0.850 inches with about a 17% increase in the area defined by the outlet-side opening 208 in comparison to the piston-side opening 207.

In one embodiment, the uppermost portion of the upper ring 201 has a larger inner diameter than the lowermost portion of the upper ring 201. Thus, as the main valve seat assembly 20 transitions from the upper ring 201 to the middle portion 202, the inner sidewall 230 is at its smallest diameter, i.e. forming the reduced diameter portion 221. The diameter of the inner sidewall 230 increases towards the bottom of the lower skirt 203. The reduced diameter portion 221 of the main valve seat flow passage 240 decreases the area of the piston body 36 exposed to exhaust.

The main valve seat flow passage 240 may be of varying diameters. In one embodiment, the main valve seat flow passage 240 has a substantially frustro-conical shape with the piston-side opening 207 corresponding to the smaller face of the conical frustum.

The structure of the main valve seat assembly 20, in particular the inner sidewall 230 and the shape and diameter of the main valve seat flow passage 240 defined thereby creates, in one embodiment, a Venturi effect. The relative disparity in diameter, and thus area, of the piston-side opening 207 with respect to the outlet-side opening 208 of the main valve seat assembly 20 results in a Venturi effect when pressurized water flows through the openings. The pressure at the piston-side opening 207 of the main valve seat assembly 20 will remain higher than the pressure at the outlet-side. This outlet-side opening 208 pressure differential reduces the impact of the exhausting of the valve 1 contents on the piston body 36, which can reduce the ability of the piston assembly 34 to seat properly. The exhaust pressure is caused, in part, by the increased pressure from the pressurized water entering the exhaust portion of the valve and the downstream fixture. The exhaust and fixture have air and/or water present, thus the introduction of water from the valve results in increased pressure. The presence of the reduced diameter portion 221 causes the pressure above the reduced diameter portion 221 to be higher than at the reduced diameter portion 221. The presence of the higher pressure serves to reduce the back-pressure exerted on the piston body 36. It should be appreciated that the exhaust pressure acts to prevent the piston body 36 from seating on the main valve seat assembly 20, thus impacting potentially the total flush volume, the flush profile, and the performance of the flushometer in general. The back pressure will typically be positive and may vary from flush cycle to flush cycle within the same valve. The differential between the piston-side opening and the outlet-side opening ameliorates the impact of the unpredictable back pressure on the performance of the piston valve.

The main valve seat assembly 20 also includes a curved shoulder 250 at the piston-side opening 207 as the diameter of the inner sidewall 230 transitions to the reduced diameter portion 221. When the piston body 36 is raised during a flush event, and the valve 1 is open, water flows over the main valve seat assembly 20, in general, and specifically over the curved shoulder 250 into the main valve seat flow passage 240. The curved shoulder 250 provides a fluid flow path that is more predictable and laminar flow path. The fluid will experience less turbulence with the curved shoulder portion 250 than with a sharp edge. Further, in one embodiment, the main valve seat assembly 20 defines a fluid flow path to the outlet that provides for greater efficiency. The main valve seat surface 210 provides for rounded edges via a curved shoulder 250 over which the water flows into the main valve seat flow passage 240. The curved shoulder 250 of the main valve seat assembly 20 result in greater efficiency as the water does not need to take sharp turn along the fluid flow path. In addition, because of the Venturi effect employed in the embodiment described above, the use of a curved shoulder 250 provides a gradual taper to a entry cone for the reduced diameter portion. The angle and size of the main valve seat assembly 20 will vary depending on the valve body. It should be appreciated that the main valve seat assembly 20 will be constrained by the dimensions of the valve body main valve seat.

In one embodiment, the piston-side opening 207 includes a counter bore 215 adjacent the piston body 36 and having a larger diameter than the main valve seat piston-side opening 207. The main valve seat counter bore 215 may have a larger diameter than the outlet-side opening 208. The counter bore 215 is positioned on the main valve seat assembly 20 adjacent the main valve seat seal member 211. In one embodiment, the piston-side opening 207 has a diameter that is less than the diameter of the counter bore 215 and less than the diameter of the outlet-side opening 208. The counterbore aids in reducing the force exerted on the piston as it closes.

The main valve seat surface 210 may include a ridge 212 circumscribing the main valve seat piston-side opening 207 and, in embodiments including the counter bore 215, the counter bore 215. The ridge 212 defining the main valve seat surface 210 against which the piston seating area 39 rests when seated. In one embodiment, the ridge 212 is at least partially disposed in a recess 213 on the upper ring 201 of the main valve seat 21. The counter bore extends into the upper ring portion 201 and has a shoulder 215A for engaging the ridge 212, the shoulder sloping from the ridge 212 to a flat surface 215b of the counterbore 215 perpendicular to the fluid flow passage 240. The upper ring portion 201 further includes the curved shoulder 250, with the flat surface 215b of the counterbore annular about and adjacent to the curved shoulder 250.

In one embodiment, the main valve seat assembly 20 includes the lower skirt 203 extending into the outlet 15 so as to completely cover the sealing wall 47 of the valve body 10. The lower skirt 203 the main valve seat assembly 20 sufficiently extends into the outlet 15 so as to prevent the piston body 36, in particular the piston ribs 76, from contacting the valve body 10. When the piston body 36 is seated, a portion of the ribs 76 and skirt 80 extend below the skirt 203.

In one embodiment, one or more locking tabs may be provided on the main valve seat assembly 20. For example, a plurality of locking tabs 260 may be positioned on the lower skirt of the main valve seat assembly 20. The locking tabs 260 engage a portion of the valve body 10. As illustrated in FIG. 1A, the locking tabs 260 may engage a flange 261 on the valve body 10.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A flush valve system comprising:
a hollow valve body having an inlet, an outlet, and a main valve seat there between;
a piston assembly movable within the hollow valve body and configured to seat upon the main valve seat to seal the inlet from the outlet;
an upper pressure chamber positioned above the piston assembly within the hollow valve body, the upper pressure chamber in fluid communication with an interior of the piston assembly;
a relief valve positioned within the piston assembly, the relief valve sealing the upper pressure chamber and interior of the piston assembly from the outlet;
the main valve seat having an upper ring, a middle portion, and a lower skirt and having a main valve seat surface for engaging the piston, an outer sidewall, and an inner sidewall defining a flow passage with a piston-side opening and an outlet-side opening, the flow passage having a reduced diameter portion at a transition from the upper ring to the middle portion below the main valve seat and the inner sidewall tapering from the reduced diameter portion to the outlet-side opening;
the piston-side opening including a counter bore on the main valve seat surface, the counter bore circumscribing a portion of the flow passage and a curved shoulder transitioning from the counterbore to the inner sidewall and the inner sidewall tapering from the reduced diameter portion to the outlet-side opening.

2. The flush valve system of claim 1, wherein the flow passage piston-side opening has a larger diameter than the reduced diameter portion and further wherein the inner sidewall tapering is about 10 degrees.

3. The flush valve system of claim 1, wherein the flow passage comprises a first diameter adjacent the piston valve, a second diameter defined by the reduced diameter portion, and a third diameter adjacent the outlet, the first diameter and third diameter being larger than the second diameter.

4. The flush valve system of claim 1, further comprising an annular ridge on a valve seat surface of the main valve seat and wherein the curved shoulder portion engaging a flat surface of the counterbore which engages the annular ridge and the annular ridge sloping to the flat surface of the counterbore, the flat surface perpendicular to the fluid flow passage, the flat surface flat surface of the counterbore annular about and adjacent to the curved shoulder transitioning from the valve seat surface to the inner sidewall.

5. A main valve assembly for a piston-type flushometer, comprising:
an upper ring, middle portion, and a lower skirt;
a main valve seat surface in the upper ring for engaging a piston, an outer sidewall, and an inner sidewall defining a flow passage with a piston-side opening and an outlet-side opening, the main valve seat surface disposed about a counterbore, the counterbore disposed in the piston-side opening;
an annular ridge on a valve seat surface and wherein the counter bore further comprises a flat surface engaging the annular ridge and a curved shoulder, the flat surface perpendicular to the fluid flow passage, the flat surface of the counterbore annular about and adjacent to the curved shoulder transitioning from the valve seat surface to the inner sidewall;
the flow passage having a reduced diameter portion at a transition from the upper ring to the middle portion below the valve seat surface and with the curved shoulder transitioning from the counterbore to the inner sidewall and the inner sidewall tapering from the reduced diameter portion to the outlet-side opening, wherein the inner sidewall tapers linearly.

6. The valve seat of claim 5, wherein the first opening has a larger diameter than the reduced diameter portion and wherein the outlet-side opening defines an area about 17% greater than the area defined by the piston-side opening.

7. The valve seat of claim 5, wherein the flow passage comprises a first diameter portion, a second diameter portion defined by the reduced diameter portion, and a third diameter portion, the second diameter portion positioned between the first diameter portion and the third diameter portion.

8. A flush valve system comprising:
a hollow valve body having an inlet, an outlet, and a main valve seat there between, the hollow valve body further including a handle opening;
a piston assembly movable within the hollow valve body and configured to seat upon the main valve seat to seal the inlet from the outlet;
an upper pressure chamber positioned above the valve member within the hollow valve body;
the piston assembly including a piston having an interior piston chamber and a cap;
the main valve seat having a main valve seat surface for engaging the piston, the main valve seat having an upper ring, a middle portion, and a lower skirt each having an outer sidewall and an inner sidewall defining a flow passage with a piston-side opening in the upper ring and an outlet-side opening in the lower skirt, the flow passage having a reduced diameter portion at a transition from the ring to the middle portion wherein the inner diameter of the main valve seat assembly increases from the middle portion to the lower skirt and the flow passage has a frustro-conical shape with the piston-side opening corresponding with the smaller face of the frustro-conical shape.

9. The flush valve system of claim 8, further comprising an actuation mechanism positioning bushing having an eccentric opening.

10. The flush valve system of claim 8, wherein the cap comprises a cylindrical body with a cylindrical lip atop the body and having a larger diameter, the cap including an exhaust passage there through the lip and body providing communication between the upper pressure chamber and the interior piston chamber, the exhaust passage being positioned substantially in the center of the cap.

11. The flush valve system of claim 8, further comprising a counter bore on the main valve seat surface, the counter bore circumscribing a portion of the flow passage.

12. The flush valve system of claim 11, comprising an annular ridge on a valve seat surface of the main valve seat.

13. The flush valve system of claim 12, wherein the annular ridge slopes to a flat surface of the counterbore, the flat surface perpendicular to the fluid flow passage, the flat surface of the counterbore annular about and adjacent to a curved shoulder which transitions from the valve seat surface to the inner sidewall.

* * * * *